United States Patent
Bruchmann et al.

(10) Patent No.: US 6,465,596 B1
(45) Date of Patent: Oct. 15, 2002

(54) LINEAR OLIGOURETHANES AND POLYURETHANES HAVING A DEFINED STRUCTURE, THEIR PREPARATION AND THEIR USE

(75) Inventors: Bernd Bruchmann, Freinsheim; Thomas Servay, Worms; Ulrich Treuling, Bensheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/566,363

(22) Filed: May 8, 2000

(30) Foreign Application Priority Data

May 8, 1999 (DE) .......................... 199 21 412

(51) Int. Cl.$^7$ .................. C08G 18/00; C08G 32/00; C08G 38/00; C08G 40/00
(52) U.S. Cl. ............................. 528/44; 528/85
(58) Field of Search ...................... 528/44, 85

(56) References Cited

U.S. PATENT DOCUMENTS

| 4,623,709 A | 11/1986 | Bauriedel |
| 5,496,909 A | 3/1996 | Mühlfeld et al. |
| 5,942,593 A | 8/1999 | Pudleiner et al. |

FOREIGN PATENT DOCUMENTS

| DE | 2901774 | 7/1980 |
| EP | A-150 444 | 8/1985 |
| EP | A 634 432 | 1/1995 |
| EP | A-696 604 | 2/1996 |

*Primary Examiner*—Patrick D. Niland
(74) *Attorney, Agent, or Firm*—Fernando A. Borrego

(57) ABSTRACT

In a process for preparing linear oligourethanes and polyurethanes by reacting 1 mole of a) diisocyanate with 1 mole of b) a compound having two groups which are reactive toward isocyanates, the functional groups of a) and/or b) have differing reactivities toward the functional groups of the other reactant and the reaction conditions are selected so that in each case only particular functional groups of a) and b) react with one another.

13 Claims, No Drawings

LINEAR OLIGOURETHANES AND POLYURETHANES HAVING A DEFINED STRUCTURE, THEIR PREPARATION AND THEIR USE

The present invention relates to linear oligourethanes and polyurethanes having a defined structure, to a process for their preparation and to their use.

Linear polyurethanes can generally be processed thermoplastically and are therefore usually referred to as thermoplastic polyurethanes (TPUs). TPUs are crystalline or partially crystalline materials and belong to the class of thermoplastic elastomers. They have a combination of advantageous material properties, for example low abrasion, good chemicals resistance and high flexibility together with high strength, with the advantages of inexpensive production which can be carried out continuously or batchwise by various known methods, for example belt or extrusion processes. An overview of TPUs, their properties and uses is given in, for example, "Kunststoff-Handbuch", volume 7, Polyurethane, $3^{rd}$ edition, 1993, edited by G. Oertel, Carl Hanser Verlag, Munich.

TPUs are generally prepared by reacting diisocyanates with compounds having two groups which are reactive toward isocyanate groups, usually bifunctional alcohols. Bifunctional alcohols used are, on the one hand, those having molecular weights of greater than 400, in particular greater than 1000. Examples are polyetherols and polyesterols. These relatively high molecular weight alcohol components form the soft phase. In addition, use is made of low molecular weight alcohols, known as chain extenders. These are usually bifunctional alcohols having a molecular weight in the range from 62 to 400.

Further details of the abovementioned starting materials may be found in the specialist literature, for example the monograph by J. H. Saunders and K. C. Frisch "High Polymers", volume XVI, Polyurethane, parts 1 and 2, Interscience Publishers 1962 and 1964, the abovementioned Kunststoff-Handbuch, volume XII, Polyurethane, or DE-A 29 01 774.

The isocyanates customarily used for preparing TPUs do not react selectively with the polyols and chain extenders in the abovementioned production processes, so that the reaction forms a random distribution of polyurethanes derived from short-chain and long-chain alcohols. Long-chain diols give, as mentioned above, the soft phase of the TPU after reaction with the diisocyanates, while the urethanes from the chain extenders form the hard phases.

However, subject to certain provisos, formation of defined structures can be advantageous in terms of the properties of the linear polyurethanes. For example, it can be advantageous to combine oligomeric or polymeric hard phase blocks with corresponding soft phase blocks, which is not able to be achieved in the case of a random, i.e. not controllable, distribution of hard and soft phases in the conventional processes.

It is an object of the present invention to find a simple process by means of which linear oligourethanes and polyurethanes having a defined structure can be prepared from commercially available raw materials.

We have found that this object is achieved by exploiting the differences in the reactivity of the isocyanate groups of preferably diisocyanates or differences in the reactivity of the functional groups of the compounds which are reactive toward isocyanates so as to selectively build up segments of the polymers in a controllable way.

The present invention accordingly provides a process for preparing linear oligourethanes and polyurethanes by reacting diisocyanates a) with compounds having preferably two groups b) which are reactive toward isocyanates, wherein a) and/or b) have functional groups having differing reactivities toward the functional groups of the other reactant and the reaction conditions are selected so that in each reaction step only particular reactive groups react with one another.

The invention also provides the oligourethanes and polyurethanes prepared by this process.

Preferably, the groups of higher reactivity in each of the compounds a) and b) will react with one another.

For the purposes of the present invention, oligourethanes are compounds which contain at least one urethane group, in the simplest case reaction products of one mole of a diisocyanate and one mole of a compound having two groups which are reactive toward isocyanate groups, and have a molecular weight $M_n$ of up to 2000 g/mol. Polyurethanes are, for the purposes of the present invention, compounds having molecular weights $M_n$ of greater than 2000 g/mol.

Instead of or in addition to the urethane group, the oligourethanes and/or polyurethanes may also contain groups resulting from the reaction of isocyanate groups and amino groups and/or mercapto groups.

For the purposes of the present invention, linear oligourethanes and polyurethanes are uncrosslinked macromolecules which contain urethane groups and have a uniform structure derived from molecules which each have a functional group A and a functional group B, with the proviso that A is a group which is reactive toward isocyanate groups and B is an isocyanate group. The molecules containing the functional groups A and B are produced in a prereaction from one mole of a diisocyanate and one mole of a compound, preferably a bifunctional compound, which is reactive toward isocyanate, where the functional groups of at least one of the two reactants have to have differing reactivities toward the other reactant. Subsequent to the prereaction, the molecules containing the functional groups A and B are polymerized intermolecularly.

For the purposes of the present invention, linear oligourethanes and polyurethanes include molecules which can have a small degree of branching. The branching can result from secondary reactions, e.g. allophanate or biuret formation, or can be introduced deliberately by addition of reactants having a functionality of greater than 2. The amount of a reactant a) and/or b) having a functionality of greater than 2 which is added should not exceed 10 mol %, based on the total mixture a) and b).

It is likewise possible to copolymerize molecules containing the functional groups A and B with other molecules containing the functional groups A and B, with these molecules either being produced separately or being formed in situ by copolymerization of a mixture of reactants. A prerequisite is that the pairs of molecules containing the functional groups A and B can react with themselves.

Suitable isocyanates for preparing the products of the present invention are in principle all organic diisocyanates; preference is given to using diphenylmethane 4,4'-diisocyanate (4,4'-MDI), tetramethylene diisocyanate, hexamethylene diisocyanate (HDI), dodecyl diisocyanate (DDI), dicyclohexylmethylene 4,4'-diisocyanate (4,4'-HMDI) or 1,3- or 1,4-bis(isocyanatomethyl)cyclohexane (BIC).

However, particular preference is given to isocyanates containing NCO groups of differing reactivity, e.g. aromatic diisocyanates such as tolylene 2,4-diisocyanate (2,4-TDI), diphenylmethane 2,4'-diisocyanate (2,4'-MDI), 3-alkyldiphenylmethane 4,4'-diisocyanate, where the alkyl radical contains from 1 to 10 carbon atoms, or aliphatic diisocyanates such as isophorone diisocyanate (IPDI), 2-butyl-2-ethylpentamethylene diisocyanate, 2-isocyanatopropylcyclohexyl isocyanate, lysine alkyl ester diisocyanate, where alkyl is from $C_1$ to $C_{10}$, dicyclohexylmethane 2,4'-diisocyanate (2,4'-HMDI) and 4-methylcyclohexane 1,3-diisocyanate (H-TDI).

Particular preference is also given to isocyanates whose NCO groups have almost the same reactivity but in which initial addition of an alcohol or amine onto one NCO group is able to induce a decrease in the reactivity of the second NCO group. Examples are isocyanates whose NCO groups are coupled via an electronic system, e.g. phenylene 1,3- and 1,4-diisocyanate, naphthylene 1,5-diisocyanate (NDI), biphenyl diisocyanate, tolidine diisocyanate or tolylene 2,6-diisocyanate (2,6-TDI). It is naturally also possible to use mixtures of the isocyanates mentioned.

As compounds having two groups which are reative toward isocyanates, preference is given to using compounds whose functional groups have differing reactivities toward NCO groups as a result of steric or electronic effects. Preference is given to using compounds having one primary and one secondary or tertiary hydroxyl group, one primary and one secondary or tertiary mercapto group, one primary and one secondary amino group, one hydroxyl group and one mercapto group, one mercapto group and one amino group or one hydroxyl group and one amino group in the molecule.

Examples of such compounds having at least two groups which are reactive toward isocyanates are propylene glycol, 1,2- and 1,3-butanediol, 1,2- and 1,3-pentanediol, propane-1,2-dithiol, butane-1,2-dithiol, N-methylhexamethylenediamine, toluenediamine, isophoronediamine, mercaptoethanol, 1-mercaptopropan-2-ol, mercaptobutanol, cysteamine, aminopropanethiol, ethanolamine, propanolamine, 2-(2'-aminoethoxy)ethanol or relatively high molecular weight alkoxylation products of ammonia, N-methylethanolamine, isopropanolamine, 2-(butylamino)ethanol, 2-(cyclohexylamino)ethanol, 2-amino-1-butanol, 5-aminopentan-1-ol, 6-aminohexan-1-ol, 9-aminodioxanonan-1-ol, 4-hydroxypiperidine, 1-hydroxyethylpiperazine, 2-aminoethyl 2-hydroxyethyl sulfide or 2-aminoethyl 2-hydroxyethyl sulfone.

It is also possible to use mixtures of the abovementioned compounds.

To obtain precisely defined structures in the preparation of the linear oligourethanes or polyurethanes, it is necessary first to react one mole of a diisocyanate, possibly having NCO groups of differing reactivities, with one mole of a compound having at least two groups which are reactive toward isocyanate groups and possibly likewise have differing reactivities, at least one of the two compounds having groups of differing reactivities, to form a compound of the A-B type which contains both a free isocyanate group and a free group which is reactive toward isocyanate groups. Altering the reaction conditions, e.g. by heating and/or by addition of catalyst, this molecule can then react intermolecularly to form a linear, unbranched oligourethane or polyurethane comprising defined blocks (A-B). These blocks A-B may, if desired, be combined with blocks A'-B, A-B' or A'-B', i.e. blocks having in each case one free isocyanate group and one free group which is reactive toward isocyanate groups, which blocks result from other diisocyanates or compounds having at least two groups which are reactive toward isocyanate groups and which blocks can either be prepared separately or be produced in situ from other formative components.

The reaction to build up the molecular weight can be stopped by addition of a compound which is reactive toward the reactive groups of the reactants or by further addition of one of the two reactants. However, the reaction can also be continued almost to complete reaction of the starting molecule to achieve very high molecular weight structures.

Since the linear oligourethane or polyurethane of the present invention has end groups of differing functionality, e.g. an NCO group at one end and an OH group at the other end, the molecules can also be functionalized or branched as desired by the procedure of stopping the intermolecular polymerization. Thus, termination by means of a diol or an aminoalcohol or a diamine makes it possible to produce molecules having OH or NH end groups while addition of a diisocyanate enables NCO end groups to be built in. These, for example, OH-, NH- or NCO-terminated oligomer or polymer blocks can be reacted with conventional building blocks of polyurethane chemistry to give linear or branched structures of higher molecular weight. Thus, for example, addition of a polyetherdiol or polyesterdiol to an NCO-terminated linear polyurethane according to the present invention enables linear thermoplastic polyurethanes to be produced.

Furthermore, termination by addition of a polyfunctional alcohol, amine or isocyanate enables star-shaped molecules to be produced.

If required, the functional end groups of the linear, unbranched polyurethanes of the present invention can also be modified or made inert.

NCO-terminated polymers can, for example, be reacted fully or partially with fatty alcohols, fatty amines or monoalcohols containing double bonds, e.g. allyl alcohol, vinyl alcohol, hydroxyethyl acrylate, hydroxybutyl acrylate or hydroxyethyl methacrylate. Hydroxyl-, mercaptan- or amine-terminated polymers can, for example, be made inert by reaction with monocarboxylic acids, for example fatty acids, or monoisocyanates, can be functionalized by means of acrylic acids, can be esterified with dicarboxylic acids or can be chain-extended by molecular addition of alkylene oxides such as ethylene oxide, propylene oxide and/or butylene oxide.

The reaction can in each case be carried out without solvent, but is preferably carried out in solution. Suitable solvents are all compounds which are liquid at the reaction temperature and are inert toward the monomers and the end products.

The linear and unbranched polyurethanes of the present invention are used, for example, as thermoplastics, for the preparation of thermoplastics, as building blocks for preparing polyurethanes or for other polyaddition or polycondensation polymers. Further possible uses are as phase compatibilizers, rheological auxiliaries, thixotropes or nucleating reagents.

The following examples illustrate the invention.

EXAMPLE 1

Preparation of a Linear Unbranched Polyurethane from IPDI and Ethanolamine, OH-terminated 44.2 g (0.2 mol) of IPDI were dissolved in 100 ml of dried dimethylacetamide (DMAc) and cooled to −5° C. At this temperature, 12.2 g (0.2 mol) of ethanolamine dissolved in 50 ml of dried DMAc were added dropwise over a period of 1 hour. The NCO content of the mixture was 4.1%. The product mixture was heated to 60° C. and 3 ml of a 2% strength solution of dibutyltin dilaurate (DBTL) in tetrahydrofuran (THF) were added. The NCO content of the mixture decreased continuously as the molar mass increased. At an NCO content of 0.3%, the reaction was stopped by addition of 1 g of ethanolamine dissolved in 5 ml of DMAc. The reaction product had an OH functionality of 2. After removal of the solvent, the following parameters were determined:

Hydroxyl number: 29 mg KOH/g
GPC analysis (calibration with PMMA)
Molar masses
$M_n$: 3818 g/mol
$M_w$: 6490 g/mol

EXAMPLE 2

Preparation of a Linear Unbranched Polyurethane from IPDI and 1,2-propanediol, OH-terminated 44.2 g (0.2 mol) of IPDI were dissolved in 100 ml of dried dimethylacetamide (DMAc) and cooled to −10° C. At this temperature, 15.2 g (0.2 mol) of 1,2-propanediol dissolved in 50 ml of dried DMAc were added dropwise over a period of 40 minutes. The mixture was subsequently heated to 80° C. and the decrease in the NCO content was monitored. At an NCO content of 0.25%, the reaction was stopped by addition of 0.8 g of ethanolamine dissolved in 5 ml of DMAc. The reaction product had an OH functionality of 2. After removal of the solvent, the following parameters were determined:

Hydroxyl number: 24 mg KOH/g
GPC analysis (calibration with PMMA)
Molar masses
$M_n$: 4765 g/mol
$M_w$: 8575 g/mol

EXAMPLE 3

Preparation of a Linear Unbranched Polyurethane from 2,4-TDI and Ethanolamine, OH-terminated 34.8 g (0.2 mol) of TDI were dissolved in 100 ml of dried dimethylacetamide (DMAc) and cooled to −15° C. At this temperature, 12.2 g (0.2 mol) of ethanolamine dissolved in 50 ml of dried DMAc were added dropwise over a period of 1 hour. The NCO content of the mixture was 4.3%. The product mixture was slowly warmed while stirring to room temperature (23° C.), during which procedure the NCO content of the mixture decreased continuously as the molar mass increased. At an NCO content of 0.5%, the reaction was stopped by addition of 1.5 g of ethanolamine dissolved in 5 ml of DMAc. The reaction product had an OH functionality of 2. After removal of the solvent, the following parameters were determined:

Hydroxyl number: 52 mg KOH/g
GPC analysis (calibration with PMMA)
Molar masses
$M_n$: 2160 g/mol
$M_w$: 3240 g/mol

EXAMPLE 4

Preparation of a Linear Unbranched Polyurethane from IPDI and 2-(2'-aminoethoxy)ethanol, NCO-terminated 222 g (1 mol) of IPDI were dissolved in 500 ml of dried dimethylacetamide (DMAC) and cooled to −5° C. At this temperature, 105 g (1 mol) of 2-(2'-aminoethoxy)ethanol dissolved in 250 ml of dried DMAC were added dropwise over a period of 2 hours. The NCO content of the mixture was then 4.0%. The product mixture was heated to 40° C. and 8 ml of a 2% strength solution of dibutyltin dilaurate (DBTL) in DMAc were added. The NCO content of the mixture decreased continuously as the molar mass increased. At an NCO content of 0.6%, the reaction was stopped by addition of 35 g of IPDI. The reaction product had an NCO functionality of 2. After removal of the solvent, the following parameters were determined:

NCO content: 3.7%
GPC analysis (calibration with PMMA)
Molar masses
$M_n$: 2347 g/mol
$M_w$: 3286 g/mol

We claim:

1. A process for preparing linear oligourethanes and polyurethanes comprising:

1) forming a reaction product containing both one free isocyanate group and one free isocyanate reactive group by reacting a) at least one diisocyanate with b) at least one compound having two isocyanate reactive groups in a 1:1 molar ratio, wherein the isocyanate groups of a) and/or the isocyanate reactive groups of b) have differing reactivities toward the isocyanate reactive groups or the isocyanate groups, respectively, of the other reactant and wherein the free isocyanate reactive group, the free isocyanate group, or both are the least reactive of b) and a) respectively; and 2) reacting the product of step 1) intermolecularly to form a linear oligourethane or linear polyurethane.

2. A process for preparing linear oligourethanes and polyurethanes as claimed in claim 1, wherein the groups of higher reactivity in each of a) and b) react with one another.

3. A process for preparing linear oligourethanes and polyurethanes as claimed in claim 1, wherein the isocyanates having at least two isocyanate groups a) are selected from the group consisting of tolylene 2,4-diisocyanate, tolylene 2,6-diisocyanate, diphenylmethane 4,4'-diisocyanate, diphenylmethane 2,4'-diisocyanate, 3-alkyldiphenylmethane 4,4'-diisocyanate, where alkyl is from $C_1$ to $C_{10}$, phenylene 1,3- and 1,4-diisocyanate, naphthylene 1,5-diisocyanate, tolidine diisocyanate, biphenyl diisocyanate, tetramethylene diisocyanate, hexamethylene diisocyanate, dodecane diisocyanate, lysine alkyl ester diisocyanate, where alkyl is from $C_1$ to $C_{10}$, isophorone diisocyanate, 2-butyl-2-ethylpentamethylene diisocyanate, 2-isocyanatopropylcyclohexyl isocyanate, 4-methylcyclohexane 1,3-diisocyanate, dicyclohexylmethane 4,4'- and 2,4'-diisocyanate, 1,3- or 1,4-bis (isocyanatomethyl)cyclohexane and mixtures thereof.

4. A process for preparing linear oligourethanes and polyurethanes as claimed in claim 1, wherein the compounds having two groups which are reactive toward isocyanates are compounds b) having one primary and one secondary or tertiary hydroxyl group or one primary and one secondary or tertiary mercapto group, one primary and one secondary amino group, one hydroxyl group and one mercapto group, one mercapto group and one amino group or one hydroxyl group and one amino group in the molecule.

5. A linear oligourethane or polyurethane prepared as claimed in any of claims 1 to 4.

6. The process as claimed in claim 1, comprising the further step of reacting the product of step 2) with a polyether diol or a polyester diol to form a linear thermoplastic polyurethane.

7. The process as claimed in claim 1, comprising the further step of reacting the reaction product of step 2) with at least one of a fatty alcohol, a fatty amine, a monoalcohol containing at least one double bond, an acrylic acid, a dicarboxylic acid, an alkylene oxide, or mixtures thereof to form a polyurethane, a polyaddition polymer, or a polycondensation polymer.

8. The process as claimed in claim 1, comprising the further step of reacting the reaction product of step 2) with at least one of a polyfunctional alcohol, a polyfunctional amine, or a polyfunctional isocyanate to form at star-shaped or comb-shaped polymer.

9. The process as claimed in claim 1, comprising the further step of conducting step 1) at a temperature equal to or less than 0° C.

10. The process as claimed in claim 9, wherein the temperature is at or below −5° C.

11. The process as claimed in claim 1, wherein the reaction product formed in step 1) is elevated to a temperature of from 23° C. to 80° C. while conducting step 2).

12. The process as claimed in claim 11, wherein step 2) comprises the further step of raising the temperature of the reaction product formed in step 1) to a temperature of greater than 28° C. and adding a reaction catalyst.

13. The process as claimed in claim 1, wherein step 2) comprises the further step of raising the temperature of the reaction product formed in step 1) to a temperature of greater than 28° C. and adding a reaction catalyst.

* * * * *